United States Patent Office 3,264,358
Patented August 2, 1966

3,264,358
BISPHENOLS
Reginald Francis Webb, Cambridge, and Ian Geoffrey
Hinton, Great Chesterford, near Saffron Walden, England, assignors to Ciba Limited, Basel, Switzerland, a company of Switzerland
No Drawing. Filed Nov. 18, 1960, Ser. No. 70,137
Claims priority, application Great Britain, Nov. 25, 1959, 40,084/59
3 Claims. (Cl. 260—619)

This invention relates to dimeric p-isopropenylphenol, its production and its use.

According to a first feature of the present invention there is provided dimeric p-isopropenylphenol of the isomeric formulae

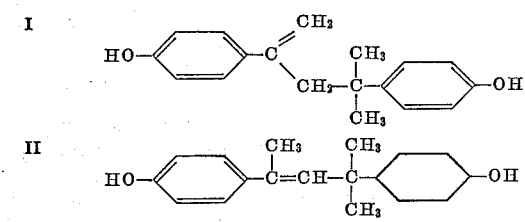

These two isomeric forms may be named as 4-methyl-2,4-bis(p-hydroxyphenyl)-pent-1-ene and the corresponding pent-2-ene isomer.

Dimeric p-isopropenylphenol is an important intermediate in the production of pure p-isopropenylphenol, itself of technical importance in the production of bis and polyphenols and of copolymers with other vinyl-containing compounds. Further, dimeric p-isopropenylphenol may itself be used in processes for the production of other important bisphenols and certain trisphenols, one of which processes forms a feature of the present invention and is referred to later herein.

According to a further feature of the present invention dimeric p-isopropenylphenol is prepared by heating p-isopropenylphenol in an inert organic diluent medium and separating the product from the reaction mixture. Most conveniently the preparation is effected by subjecting p-isopropenyl-phenol to reflux in a medium of cyclohexane.

Corson et al. (J. Organic Chemistry, vol. 23 (1958), page 544) has described the production of meta and para-isopropenylphenol by dehydrogenation of the corresponding isopropylphenols and indicates that the isopropenylphenols on standing produce high molecular weight polymers of indeterminate constitution. The crude mixture obtained by such dehydrogenation contains both the isopropylphenol and the isopropenylphenol and it is a feature of the above process of the present invention that the crude mixture resulting from such dehydrogenation may be employed as starting material and that dimeric p-isopropenylphenol is obtained thereby in substantially pure form.

It is well known that compounds containing a vinylic group may be polymerized by the action of certain free radical initiators (e.g. benzoyl peroxide) and also by acids. In particular, it is well known that α-methylstyrene may be converted into high molecular weight polymers by the action of acids or Lewis acids, but that low molecular weight products may be obtained by the action of heat alone. However, in most cases involving thermal treatment, complex mixtures of low molecular weight products are obtained.

It is accordingly somewhat unexpected that the process of the present invention yields the required dimeric p-isopropenylphenol in a condition of substantial purity. The product obtained may be characterized by its smooth decomposition on heating to give pure p-isopropenylphenol, by composition analysis, hydroxyl group content, infra-red absorption and by its catalytic hydrogenation to the corresponding saturated bisphenol of the formula

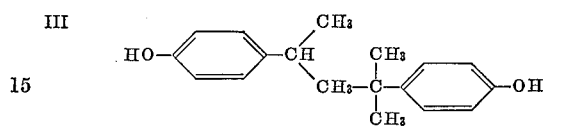

It has further been found that the bisphenols of Formulae I and II may be used as starting materials in a new method for the production of the phenolic indane derivative, 1,3,3-trimethyl-1-p-hydroxyphenyl-indan-6-ol, which is of technical importance as an intermediate in the production of epoxy resins, phenol formaldehyde resins, polyesters and antioxidants.

A class of compounds within which the aforesaid indane derivative falls has been described which have the general formula

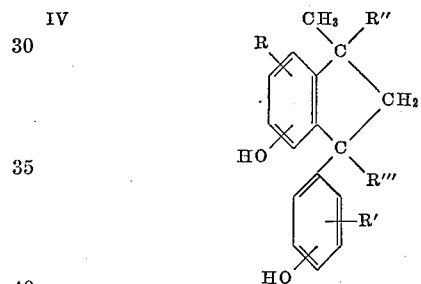

where R and R' are hydrogen or alkyl groups containing 1 to 4 carbon atoms and R" and R''' are alkyl groups containing 1 to 4 carbon atoms. The compounds of general Formula IV were produced from the dimers of substituted styrenes of the general formula

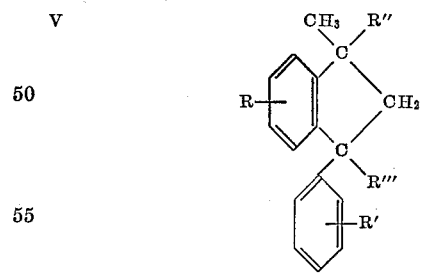

wherein R, R', R" and R''' have the meanings given above, by sulfonation followed by alkaline fusion of the sulfonated products.

These sulfonation and alkali fusion processes have the disadvantages that they are tedious, require special equipment and are not applicable to substances which are sensitive to strong sulfuric acid and alkalis.

According to a further feature of the present invention a process for the preparation of the indane derivative having the formula

VI

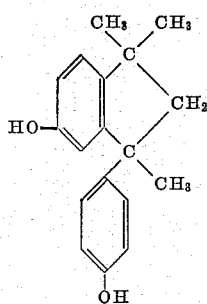

which obviates the above disadvantages, comprises treating with an acid catalyst dimeric p-isopropenylphenol.

Suitable acid catalysts are hydrogen chloride gas, hydrochloric acid, sulfuric acid, phosphoric acid, strong organic acids such as toluene-p-sulfonic acid, methanesulfonic acid and trichloroacetic acid, ion exchange resins containing strong acid functions such as sulfonated polystyrene, and Lewis acids such as stannic chloride, aluminum chloride and borontrifluoride. Generally hydrochloric acid and sulfuric acid are preferred.

The reaction may be effected within the temperature range from −10° to 150° C., preferably between 20° and 100° C., and in solution using such inert solvents as alcohols e.g. methanol, ethanol or propanol, chlorinated hydrocarbons, e.g. chlorobenzene, dichlorobenzene, chloroform, methylene dichloride and trichloroethylene, or hydrocarbon solvents such as benzene, toluene, xylene, cyclohexane, hexane and petroleum ether. As an alternative to using an inert solvent, the reaction may be effected in suspension, e.g. by heating the dimer in aqueous hydrochloric acid solution. Short reaction times are preferred, since it has been demonstrated that prolonged reaction gives products which are more difficult to purify.

The indane derivative of Formula VI may readily be converted into the corresponding glycidyl ethers by treatment with epichlorhydrin or glycerol dichlorohydrin and alkali in the manner well known to those skilled in the art. The epoxy resins so produced can be cured alone or in admixture with those derived from other polyphenols such as Bisphenol A, phenol-formaldehyde novolaks, resorcinol-formaldehyde novolaks and from polyhydric alcohols in the production of resins useful as moulding and potting resins, as laminating resins and as adhesives. Such resins undergo transformation to tough, infusible and chemically resistant cured products when treated with reagents normally used for curing epoxy resins, such as polycarboxylic acids, certain acid anhydrides and aliphatic and aromatic amines.

The following examples, in which the parts indicated are parts by weight, will serve to illustrate the invention.

EXAMPLE 1

*Preparation of 4-methyl-2,4-bis(p-hydroxyphenyl)-pent-1 (and 2)-ene* p-Isopropenylphenol (250 parts) was suspended in boiling cyclohexane (1500 parts). After a few minutes the solid became a yellow oil, which during 60 hours hardened to a white crystalline solid. The mixture was cooled and the cyclohexane solution decanted and evaporated to yield only a trace of white solid. The product was broken up and dried to give 4-methyl-2,4-bis(p-hydroxyphenyl)-pent-1 (and 2)-ene which after recrystallization from cyclohexane had M.P. 128–32° C. On hydrogenation the material took up 0.98 moles/268 g. The hydroxyl content as determined by the method of Ogg, Porter and Willits was 1.9 groups/268 g. Analysis (percent) gave: C, 80.4; H, 7.5; $C_{18}H_{20}O_2$ requires C, 80.6; H, 7.5. The infra-red absorption spectrum showed a band at 895 cm.$^{-1}$ due to

at 810 cm.$^{-1}$ due to

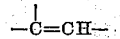

and at 830 cm.$^{-1}$ due to p-disubstituted benzene. On reaction with epichlorohydrin in the presence of sodium hydroxide the 4-methyl - 2,4-bis(p-hydroxyphenyl)-pent-1 (and 2)-ene, prepared as above, was converted into its diglycidyl ether, epoxide content 4.14 equivalents/kg.

When 4-methyl-2,4-bis-(p-hydroxyphenyl)-pent-1 (and 2)-ene (8.25 parts), prepared as above, was hydrogenated in methanol at room temperature and atmospheric pressure over palladium black, the hydrogen uptake was 710 ml. (98% theoretical). The resulting solution was filtered, the methanol removed and the residue distilled at 250° C./14 mm. Hg to give white crystalline 4-methyl-2,4-bis-(p-hydroxyphenyl)-pentane, M.P. 110° C. The infra-red absorption spectrum of this compound showed no band at 895 cm.$^{-1}$ due to

nor at 810 cm.$^{-1}$ due to

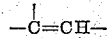

but showed a strong band at 831 cm.$^{-1}$ due to p-disubstituted benzene. This material was converted to its diglycidyl ether (B.P. 224–6° C. at 0.3 mm. Hg and epoxide content 5.7 equivalents/kg.) by treatment with epichlorohydrin and sodium hydroxide.

When 4-methyl-2,4-bis-(p-hydroxyphenyl)-pent-1 (and 2)-ene, prepared as above, was heated at 14 mm. Hg pressure it was converted to p-isopropenylphenol which distilled (B.P. 120–2° C./14 mm.) leaving a negligible residue and was condensed as a pale yellow solid. Hydrogenation of this product gave an uptake of 0.85 moles/134 g. and distillation of the hydrogenated material gave only p-isopropylphenol, B.P. 110° C./14 mm. Hg, M.P. 60–2° C.

EXAMPLE 2

*Preparation of 1,3,3-trimethyl-1-p-hydroxyphenyl-indan-6-ol*

Twenty parts of the dimer of p-isopropenylphenol and 20 parts of concentrated hydrochloric acid were heated under reflux for 2 hours. The mixture was cooled, the acid decanted off and the solid collected, washed with water and distilled, affording a brittle resin, B.P. 250–270° C./14 mm., consisting essentially of 1,3,3-trimethyl-1-p-hydroxyphenyl-indan-6-ol. The infra-red spectrum of this product was identical with that of the product formed from α-methyl styrene dimer by sulfonation and alkali fusion. The product was further characterized by conversion to the corresponding diglycidyl ether, with epichlorohydrin and alkali in the usual way, and by the absence of unsaturation, as determined by catalytic hydrogenation.

What is claimed is:

1. A process for the production of dimeric p-isopropenyl phenol having the isomeric formulae:

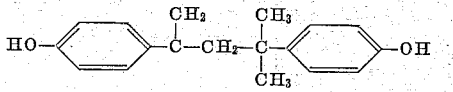

and

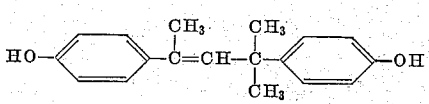

which consists essentially of heating p-isopropenylphenol in an inert organic diluent medium and separating the product from the reaction mixture.

2. A process according to claim 1, wherein the p-isopropenyl-phenol is refluxed in a medium cyclohexane.

3. The product of the process of claim 1 consisting of the isomeric forms having the formulae

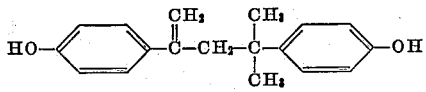

and

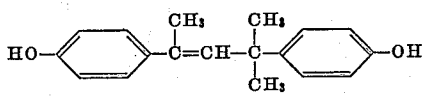

References Cited by the Examiner

UNITED STATES PATENTS 2,979,534   4/1961   Peptropoulos et al. ___260—619

OTHER REFERENCES

Beilstein: Organische Chemie, vol. VI, 2nd ed., pages 992 and 1006, 1944.

Curtis: Chemistry and Industry, July 16, 1960, page 928.

Liebigs Analen der Chemie, vol. 472 (1929), pages 65, 66.

German printed application No. 1,004,168, Jacobs, published March 1957.

German printed application No. 1,112,980, Krimm et al., published August 1961.

LEON ZITVER, *Primary Examiner.*

H. G. MOORE, M. B. ROBERTO, D. M. HELFER, *Assistant Examiners.*